(12) United States Patent
Yoon et al.

(10) Patent No.: US 10,979,158 B2
(45) Date of Patent: Apr. 13, 2021

(54) USER EQUIPMENT INCLUDING SPECTRUM ANALYZER, AND NETWORK DEVICE

(71) Applicant: T-Mobile USA, Inc., Bellevue, WA (US)

(72) Inventors: Jong Sung Yoon, Sammamish, WA (US); Jie Hui, Mercer Island, WA (US); Daniel Howard Wilson, Puyallup, WA (US); Thomas P. Lucht, Seattle, WA (US); Antoine T. Tran, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 26 days.

(21) Appl. No.: 15/877,104

(22) Filed: Jan. 22, 2018

(65) Prior Publication Data

US 2019/0044632 A1   Feb. 7, 2019

Related U.S. Application Data

(60) Provisional application No. 62/540,923, filed on Aug. 3, 2017.

(51) Int. Cl.
*H04B 17/327* (2015.01)
*H04L 25/02* (2006.01)
(Continued)

(52) U.S. Cl.
CPC ........... *H04B 17/327* (2015.01); *H04B 17/27* (2015.01); *H04B 17/318* (2015.01);
(Continued)

(58) Field of Classification Search
None
See application file for complete search history.

(56) References Cited

U.S. PATENT DOCUMENTS

| 6,169,896 | B1 * | 1/2001 | Sant | H04W 24/00 |
| | | | | 379/9 |
| 6,434,186 | B2 * | 8/2002 | Dowling | H04W 48/16 |
| | | | | 375/147 |

(Continued)

FOREIGN PATENT DOCUMENTS

| EP | 3200521 A1 | 8/2017 |
| KR | 101430473 B1 | 8/2014 |

OTHER PUBLICATIONS

The PCT Search Report and Written Opinion dated Nov. 7, 2018 for PCT Application No. PCT/US2018/042839, 14 pages.

*Primary Examiner* — Lonnie V Sweet
(74) *Attorney, Agent, or Firm* — Lee & Hayes, P.C.

(57) ABSTRACT

User equipment (UE) can include a spectrum analyzer to monitor characteristics of transmission channels. The user equipment can monitor a 600 MHz spectrum and associated channels, for example, to determine if the spectrum is free of interference or is currently occupied. The UE can analyze a received signal strength indication (RSSI), a reference signal received power (RSRP), a reference signal received quality (RSRQ), and signal-to-interference-plus-noise ratio (SINR), for example, to distinguish between types of interference if a channel is occupied. User equipment (UE) can aggregate data and report such data to a network device further aggregate the data and to generate reports. Network components can be deployed or optimized based at least in part on network metrics provided by individual UEs or aggregated data provided by a plurality of UEs. In some instances, the UE can be a mobile phone of a customer to gather metrics in a distributed manner.

24 Claims, 8 Drawing Sheets

(51) Int. Cl.
  *H04W 24/10* (2009.01)
  *H04B 17/336* (2015.01)
  *H04B 17/27* (2015.01)
  *H04B 17/318* (2015.01)
  *H04W 16/14* (2009.01)

(52) U.S. Cl.
  CPC ....... *H04B 17/336* (2015.01); *H04L 25/0204* (2013.01); *H04W 24/10* (2013.01); *H04W 16/14* (2013.01)

(56) References Cited

U.S. PATENT DOCUMENTS

| | | | |
|---|---|---|---|
| 8,260,210 B2 | 9/2012 | Esteve Asensio et al. | |
| 8,391,897 B1* | 3/2013 | Oroskar | H04W 60/00 455/458 |
| 2009/0290552 A1* | 11/2009 | Bertorelle | H04L 5/06 370/329 |
| 2012/0274309 A1* | 11/2012 | Suryan | G01R 23/16 324/76.29 |
| 2013/0237227 A1 | 9/2013 | Nagaraja et al. | |
| 2014/0052871 A1 | 2/2014 | Andrianov et al. | |
| 2015/0264681 A1* | 9/2015 | Vadlamudi | H04W 72/0446 455/452.1 |
| 2015/0312771 A1* | 10/2015 | Li | H04W 24/02 455/446 |
| 2016/0249241 A1* | 8/2016 | Barmettler | G06F 3/04847 |
| 2017/0245280 A1* | 8/2017 | Yi | H04K 3/00 |
| 2017/0339012 A1* | 11/2017 | He | H04W 24/00 |

\* cited by examiner

800

```
┌─────────────────────────────────────────────────┐
│  DETERMINE A POWER RESOURCE OF A USER EQUIPMENT │
│                      802                        │
└─────────────────────────────────────────────────┘
                         │
                         ▼
┌─────────────────────────────────────────────────┐
│     DETERMINE A LOCATION OF THE USER EQUIPMENT  │
│                      804                        │
└─────────────────────────────────────────────────┘
                         │
                         ▼
┌─────────────────────────────────────────────────┐
│ INITIATE SCANNING OF AT LEAST ONE CHANNEL BASED │
│   AT LEAST IN PART ON THE POWER RESOURCE AND    │
│       THE LOCATION OF THE USER EQUIPMENT        │
│                      806                        │
└─────────────────────────────────────────────────┘
```

FIG. 8

USER EQUIPMENT INCLUDING SPECTRUM ANALYZER, AND NETWORK DEVICE

CROSS REFERENCE TO RELATED APPLICATIONS

This patent application claims priority filing benefit from U.S. Provisional Patent Application No. 62/540,923, filed Aug. 3, 2017, the entirety of which is hereby incorporated by reference.

BACKGROUND

Modern telecommunication systems include heterogeneous mixtures of second, third, and fourth generation (2G, 3G, and 4G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

To facilitate advances in communication technologies, frequency bands allocated for a first use can be reallocated for a second use. One example is a recent incentive auction to reallocate the 600 MHz band previously allocated for digital TV broadcast for cellular-wireless communications, such as LTE Band 71. However, it can be difficult to coordinate the transition from the first use to the second use, which can cause interference in wireless signals. Network providers can commission drive testing, which often includes vehicle-based testing equipment to gather network data. However, such drive testing can be limited to testing on roads, can provide limited information, and can be prohibitive in terms of cost and time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 8 illustrates an example process for initiating scanning based on a power resource and/or location of user equipment, as described herein.

DETAILED DESCRIPTION

Figure 1:
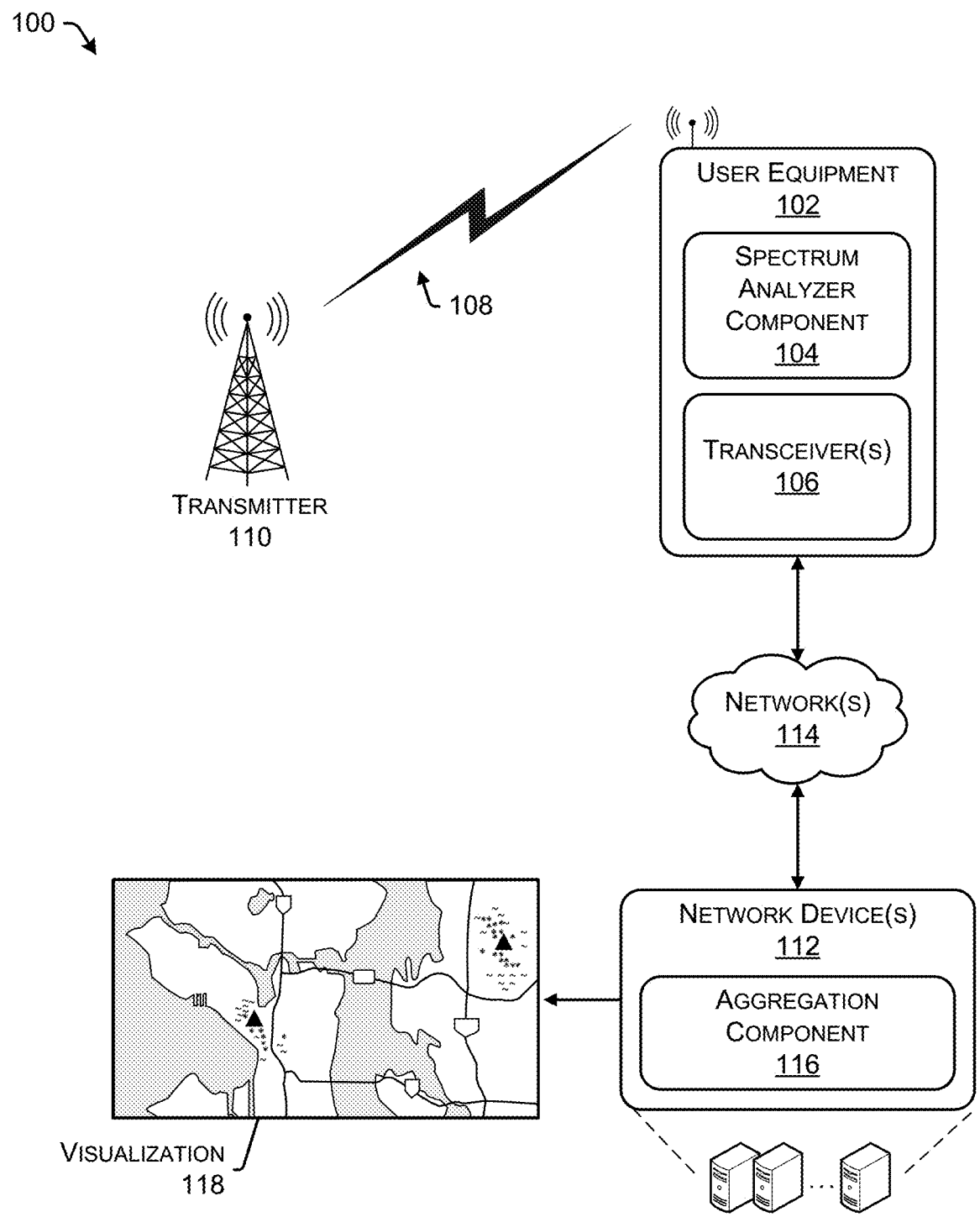
FIG. 1 illustrates an example environment including a user equipment including a spectrum analyzer to facilitate mobile collection of network metrics, as described herein.

Systems, devices, and methods are directed to user equipment including a spectrum analyzer to determine network metrics, and a network device for analyzing such network metrics. In some instances, the spectrum analyzer can be implemented as an application or component running on the user equipment configured to interact with an operating system component of the user equipment. The spectrum analyzer can instruct the operating system component to control software and/or hardware associated with a transceiver of the user equipment to scan various channels in a frequency resource to determine metrics associated with the frequency resource. In some instances, the frequency resource can be outside of a frequency band or range used by the user equipment to conduct communications. In some instances, the one or more metrics can include, but are not limited to, a received signal strength indication (RSSI), a reference signal received power (RSRP), a reference signal received quality (RSRQ), a signal-to-interference-plus-noise ratio (SINR), and/or a power density for a specific bandwidth in a frequency domain. The one or more metrics can be sent to the network device for aggregation and determination of an interference level (e.g., an existing interference level, an estimated interference level, etc.), for example, to determine whether to deploy a transmitter to a location, to deploy a network engineer to tune one or more transmitters to reduce the interference, and the like.

In one use case, the techniques discussed herein can be implemented on a user equipment configured to facilitate user communications using first frequency resources. In some instances, the first frequency resources can include, but are not limited to, an LTE Band 12 (e.g., a 700 MHz Band), an LTE Band 4 (e.g., 1700 MHz band and/or a 2100 MHz band), an LTE Band 2 (e.g., a 1900 MHz band), an LTE Band 66 (e.g., a 1700 MHz band and/or a 2100 MHz extended band), a UNITS Band 4, UMTS Band 2, GSM Band 2, and the like. Further, a spectrum analyzer can be implemented as an application on the user equipment to intermittently scan second frequency resources. In some instances, the second frequency resources can be separate from the first frequency resources. For example, the second frequency resources can include, but are not limited to, an LTE Band 71(e.g., a 600 MHz band), an LTE Band 48 (e.g., 3500 MHz), and the like. As can be understood, the first frequency resource and the second frequency resource can include any range of wireless frequencies capable of being used to communicate data. Thus, in general, the techniques can include the user equipment using the first frequency resources for communication(s) (e.g., voice communication, data communications, etc.), and can use the spectrum analyzer to scan the second frequency resources, without using the second frequency resources for communication(s). However, in some instances, the techniques can include utilizing the second frequency resources for communication(s), while monitoring metrics associated with the resources to determine sources of interference, for example.

Further, in some instances, the techniques described herein can include determining one or more of a power resource or a location of the user equipment, and initiating scanning of a frequency resource based at least in part on the power resource or the location. For example, if a battery of the user equipment is below a threshold value, the spectrum analyzer can be prevented from scanning a frequency resource. In another example, if a location of the user equipment is outside of an area, such as a geofenced location, the user equipment can be prevented from scanning the frequency resource.

In some instances, the spectrum analyzer can initiate scanning of a frequency resource at a time in which the user equipment is not utilizing the frequency resource for a communication. In some instances, the spectrum analyzer can initiate scanning of the frequency resource at a time in which the user equipment is utilizing the frequency resource for a communication.

The systems, devices, and techniques described herein can improve a functioning of a network by capturing metrics associated with frequency resources that can be used to deploy and/or optimize network hardware. For example, the systems, devices, and techniques can determine when a network resource is occupied by a legacy transmission element (e.g., a television station) to determine that the legacy transmission element can be disabled to allow for the network resource to be utilized for communications by and between user equipment. Further, determining metrics can allow network engineers to tune components (e.g., power level(s), antenna orientation(s), frequency overlap(s), and the like) in a system to reduce interference caused by the various components. Additionally, the systems, devices, and techniques discussed herein provide a distributed framework for spectrum analysis, which can provide network information more efficiently than drive testing, for example. In some instance, the techniques can be used to reduce power consumption to extend a battery life of a user equipment during testing. Further, location-based initiating of scanning can reduce congestion and/or processing of data where such data is not needed. These and other improvements to the functioning of a computer and network are discussed herein.

The systems, devices, and techniques described herein can be implemented in a number of ways. Example implementations are provided below with reference to the following figures.

FIG. 1 illustrates an example environment 100 including a user equipment (UE) including a spectrum analyzer to facilitate mobile collection of network metrics, as described herein.

In some instances, a user equipment 102 can include a spectrum analyzer component 104 and one or more transceiver(s) 106. In general, the user equipment 102 can receive a signal 108 output by a transmitter 110 to determine one or more metrics associated with the signal 108. In some instances, the user equipment 102 can receive the signal 108 and analyze the signal 108, as discussed herein, independent of conducting any communications via the signal 108 and/or the transmitter 110. For example, the transmitter 110 can represent a television transmitter transmitting the signal 108 in a 600 MHz band. In some instances, the transmitter 110 can represent any one-directional or two-directional wireless communication transceiver.

In some instances, the one or more transceiver(s) 106 can receive the signal 108 at the user equipment 102, and the spectrum analyzer component 104 can determine various metrics associated with the signal 108. For example, the one or more metrics can include, but are not limited to, one or more of a received signal strength indication (RSSI), a reference signal received power (RSRP), a reference signal received quality (RSRQ), and a signal-to-interference-plus-noise ratio (SINR). Further, the metrics can include a channel identifier (e.g., channel 1, 2, . . . , N (where N is an integer)) and/or an indication of a frequency associated with a channel (e.g., 617-622 MHz, 622-627 MHz, 627-632 MHz, . . . , 647-652 MHz). In some instances, the metrics can include a number of channels associated with a particular frequency band. In some instances, the metrics can be determined independently for a channel or for a block of frequencies. In some instances, based at least in part on metrics, the user equipment 102 and/or a network device can determine characteristics of the signal 108, such as whether the signal is a television signal or a signal for wireless communication (e.g., to exchange (bidirectional) voice and/or data).

In some instances, the user equipment 102 can receive a plurality of signals, for example, by tuning one or more filters associated with the transceiver(s) 106, to isolate a specific frequency of a signal. Other techniques can be used to configure the user equipment 102 to receive a range of frequencies.

The user equipment 102 can communicate with one or more network device(s) 112 via one or more network(s) 114.

In some instances, the network device(s) 112 can include an aggregation component 116 that can receive one or more metrics from the user equipment 102, as well as other user equipment, and aggregate the metrics to generate a visualization 118. In some instances, and as discussed herein, the visualization 118 can be used, at least in part, to determine locations of transmitters that are active and that should otherwise be inactive, to determine locations where to deploy base stations or other network devices, to determine locations where a network signal is associated with poor quality, to inform decisions regarding optimization of wireless transmissions, and the like. As can be understood, the aggregation component 116 is not limited to outputting the visualization 118, and any number of visualizations or data can be utilized, as discussed herein.

Examples of the user equipment 102 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user equipment 102 include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network.

In some instances, the network device(s) 112 can be implemented as one or more communication servers to facilitate communications by and between the various devices in the environment 100. That is, the network device(s) 112 can represent any computing devices implementing various aspects of one or more of second, third, and fourth generation (2G, 3G, and 4G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Thus, the network device(s) 112 may implement GSM, UMTS, and/or LTE/LTE Advanced telecommunications technologies. The network device(s) 112 may include, but is not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the network device(s) 112, and/or the network(s) 114. In some embodiments, the network device(s) 112 are operated by a service provider. While FIG. 1 illustrates the network device(s) 112, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

Examples of the network(s) 114 can include, but are not limited to networks including second-generation (2G), third-generation (3G), or fourth-generation (4G) cellular networks, such as LTE (Long Term Evolution), and data networks, such as Wi-Fi networks.

In some instances, the user equipment 102 can communicate with any number of user equipment, servers, network devices, computing devices, and the like.

Figure 2A:
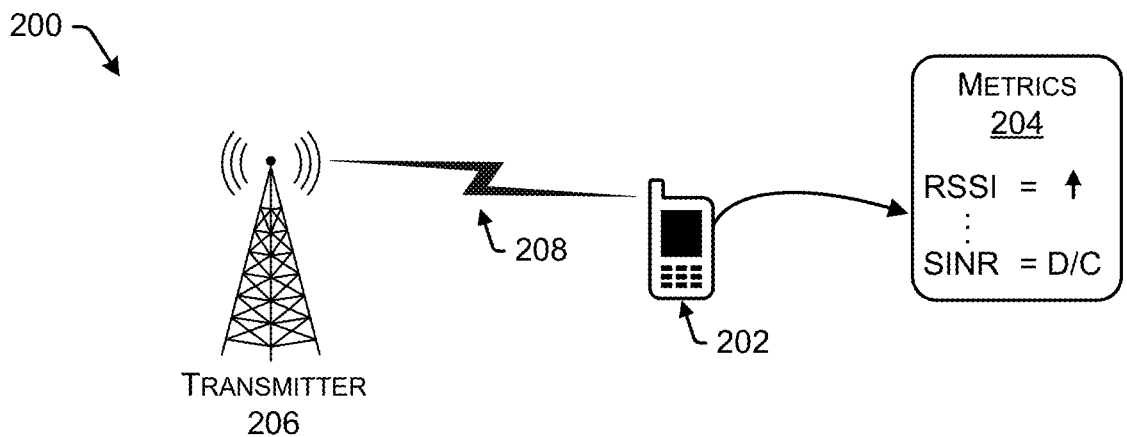
FIG. 2A illustrates an example environment including a user equipment capturing metrics associated with a transmitter, as described herein.

FIG. 2A illustrates an example environment 200 including a user equipment 202 capturing metrics 204 associated with a transmitter 206, as described herein. In some instances, the user equipment 202 can receive a signal 208 output by the transmitter 206 and can determine the metrics 204 associated with the signal 208. As illustrated, the metrics 204 associated with the signal 208 indicate a relatively high RSSI (e.g., indicated by ↑ (an up arrow)), and an unknown SINR (e.g., indicated by d/c ("don't care")). That is, in some instances, the user equipment 202 can receive the signal 208 and can determine that the signal 208 does not include a reference signal, for example, resulting in an invalid RSRP determination. Thus, the user equipment 202 can determine that the signal 208 is not associated with a wireless communication, and therefore can ignore or skip a determination of the SINR of the signal 208. In some instances, although discussed in terms of the user equipment 202 processing the signal 208, any element (such as the network device(s) 112) can process the signal 208 and/or make any determinations, as discussed herein.

Further, in some instances, the user equipment 202 can send the metrics 204 to a network device (such as the network device(s) 112) for aggregation and processing.

In some instances, the user equipment 202 can monitor the signal 208 without utilizing the frequency resources associated with the signal 208 for communication(s). That is, the user equipment 202 can communicate with other devices using a separate base station or wireless transceiver, not illustrated in FIG. 2A.

Figure 2B:
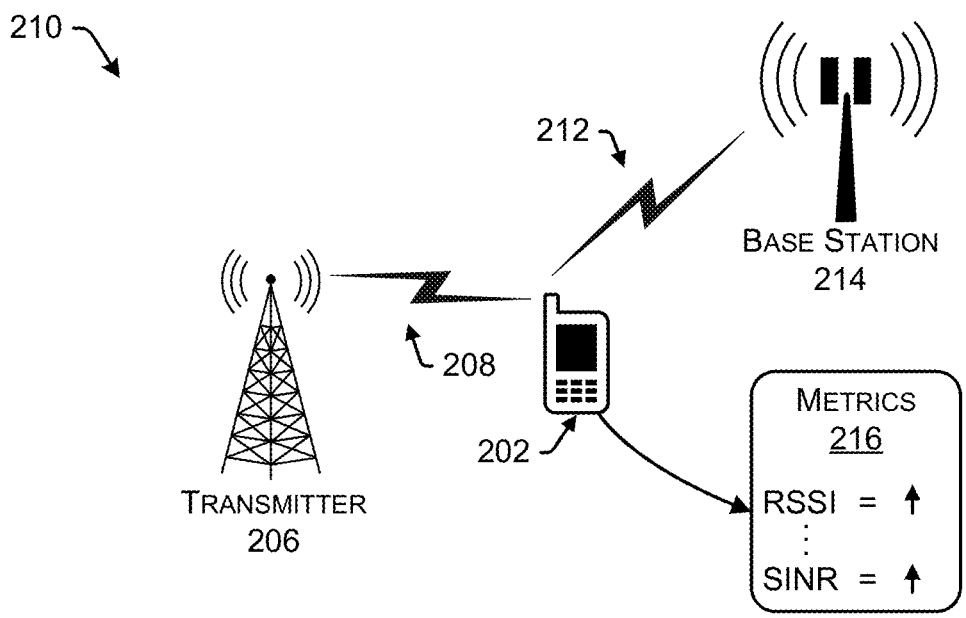
FIG. 2B illustrates an example environment including a user equipment capturing metrics associated with multiple signals, as described herein.

FIG. 2B illustrates an example environment 210 including the user equipment 202 capturing metrics associated with multiple signals, as described herein. For example, the user equipment 202 can receive the signal 208 output by the transmitter 206 and can receive a signal 212 output by the base station 214.

In some instances, the user equipment 202 can be utilizing the base station 214 for communication(s) with other servers and/or user equipment. In some instances, the signal 212 can be associated with a first set of frequency resources and the signal 208 can be associated with a second set of frequency resources. In some instances, at least a portion of the first set of frequency resources can overlap with at least a portion of the second set of frequency resources. Thus, the signal 208 can be received as noise and/or interference with respect to the signal 212.

The user equipment 202 can determine one or more metrics 216 associated with the signal 212 (or 208). For example, as illustrated, the metrics 216 associated with the signal 212 indicate a relatively high RSSI (e.g., indicated by ↑ (an up arrow)), and a relatively low SINR (e.g., indicated by ↓ (a down arrow)). Thus, the metrics 216 can indicate that the signal 212 is a communications signal and that it is experiencing noise and/or interference. As discussed herein, the user equipment 202 can determine a location of the user equipment 202 associated with the metrics 216 and can provide the metrics 216 and the location to a network device for aggregation and/or subsequent analysis.

In some instances, the metrics 216 can be associated with a particular channel or set of frequency resources, rather than with a particular signal.

Of course, the metrics 204 and 216 can include any qualitative and quantitative measurements of signals, and are not limited to the metrics discussed in connection with FIGS. 2A and 2B. For example, metrics can include RSRP and/or RSRQ, which can be used to determine whether any noise and/or interference is caused by a neighboring cell (e.g., a neighboring communication node) or a television signal. In a further example, the metrics 204 and 216 can be used to distinguish between a variety of use cases. In a first use case, a RSSI can be low with a high interference, where by the high interference can result from a weak signal (e.g., without a TV signal). In a second use case, a RSSI can be high with a high interference, and a determination can be made whether there is an interfering LTE signal, for example. In such as case, if there is no neighboring interfering LTE signal, for example, a determination can be made that an interfering TV signal, for example, is likely. In a third use case, if the SINR is low, no interference (e.g., LTE signal, TV signal, etc.) is expected.

In some instances, the first set of frequency resources (e.g., utilized by the signal 212) can be independent of the second set of frequency resources (e.g., utilized by the signal 208). In some instances, the user equipment 202 can be connected to the base station 214 via the signal 212 to facilitate a communication by and between the user equipment 202 and another device. Further, the user equipment can receive the signal 208 and monitor metrics associated with the signal independent of any metrics associated with the signal 212. In some instances, the user equipment 202 can determine metrics for a plurality of frequency resources and/or channels, for example.

Thus, FIGS. 2A and 2B illustrate various examples whereby the metrics 204 and 216 captured and/or determined by the user equipment 202 can provide information about a topology of a network or the environments 200 and 210.

Figure 3:
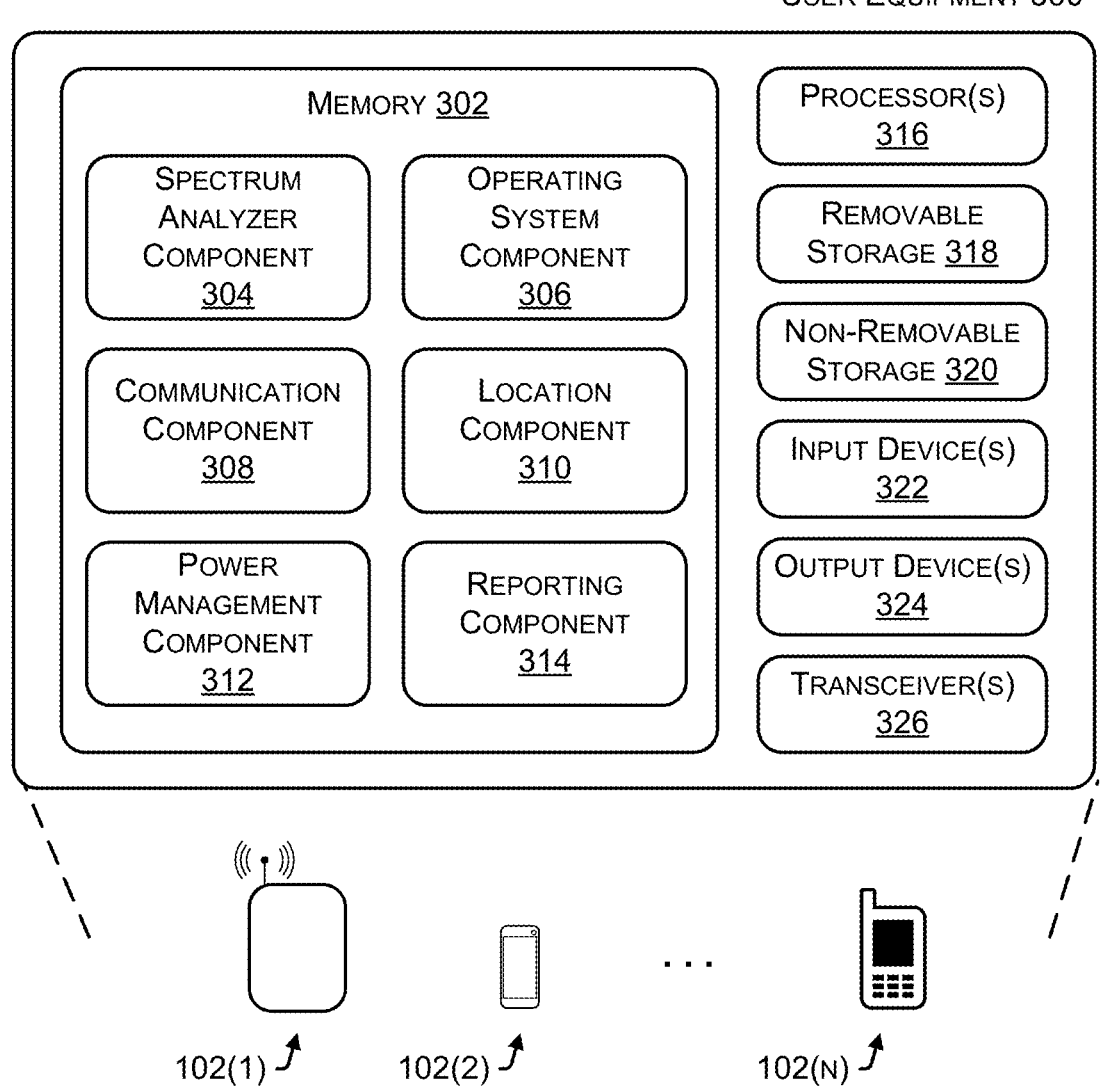
FIG. 3 illustrates an example user equipment configured to implement the spectrum analyzer, in accordance with embodiments of the disclosure.

FIG. 3 illustrates an example user equipment 300 configured to implement the spectrum analyzer, in accordance with embodiments of the disclosure. In some embodiments, the user equipment 300 can correspond to the user equipment 102 and 202 of FIGS. 1 and 2. It is to be understood in the context of this disclosure that the user equipment 300 can be implemented as a single device or as a plurality of devices with components and data distributed among them. By way of example, and without limitation, the user equipment 300 can be implemented as various user equipment 102(1), 102(2), . . . , 102(N).

As illustrated, the user equipment 300 comprises a memory 302 storing a spectrum analyzer component 304, an operating system component 306, a communication component 308, a location component 310, a power management component 312, and a reporting component 314. Also, the user equipment 300 includes processor(s) 316, a removable storage 318 and non-removable storage 320, input device(s) 322, output device(s) 324, and transceiver(s) 326.

In various embodiments, memory 302 is volatile (such as RAM), non-volatile (such as ROM, flash memory, etc.) or some combination of the two. The spectrum analyzer component 304, the operating system component 306, the communication component 308, the location component 310, the power management component 312, and the reporting component 314 stored in the memory 302 can comprise methods, threads, processes, applications or any other sort of executable instructions. The spectrum analyzer component 304, the operating system component 306, the communication component 308, the location component 310, the power management component 312, and the reporting component 314 can also include files and databases.

The spectrum analyzer component 304 can include functionality to determine one or more metrics associated with a signal received, detected, or otherwise monitored by the user equipment 300. For example, the spectrum analyzer component 304 can determine metrics including but not limited to RSSI, RSRP, RSRQ, SINR, power density and the like for a specific bandwidth in the frequency domain. In some instances, information can be associated with the metrics, such as a band number, channel number, block identifier, and the like. In some instances, the spectrum analyzer component 304 can scan a frequency resource at any regular or irregular interval, or can initiate a scan based on an internal or external trigger or command. For example, the spectrum analyzer component 304 can receive an instruction from a remote network device to initiate a scan. In some instances, the spectrum analyzer component can determine operating conditions or characteristics of the user equipment 300 (e.g., a power resource, location, etc.), and a command to initiate scanning can be based at least in part on those operating conditions or characteristics. In some instances, the spectrum analyzer component 304 can include previously-collected measurements. In some instances, the spectrum analyzer component 304 can sample conditions of a signal over a period of time and perform a statistical analysis to determine additional metrics (e.g., average, median, high, low, etc.) associated with the signal.

In some instances, the spectrum analyzer component 304 can be implemented as an application operating on the user equipment 300. In some instances, to initiate a scan of one or more frequency resources, the spectrum analyzer component can call an API (application programming interface) implemented in the operating system component 306, for example.

In some instances, the spectrum analyzer component 304 can include functionality to present a user interface on the user equipment 300, for example, to receive an indication from a user enabling or disabling a spectrum analyzer mode of the spectrum analyzer component 304. For example, in some instances, a user of the user equipment can turn on or turn off the spectrum analyzer component 304 based on personal preferences, incentives from a service provider, inclusion in a voluntary program, and the like.

In some instances, the spectrum analyzer component 304 can correspond to the spectrum analyzer component 104 of FIG. 1.

The operating system component 306 can include functionality to query a chipset of the user equipment 300, and/or to query the transceiver(s) 326, to instruct the transceiver(s) 326 and/or any software or hardware to scan one or more channels or frequency resources to determine metrics associated with the channel or frequency resources, for example. In some instances, the operating system component 306 can include a first API to receive instructions from the spectrum analyzer component 304 and to provide data to the spectrum analyzer component 304, and a second API to issue instructions to software or hardware associated with a modem or the transceiver(s) 326 and to receive data from such components.

The communication component 308 can include functionality to conduct communications with one or more other devices, as discussed herein. In some instances, the communication component 308 can conduct a communication via a first set of frequency resources, while the spectrum analyzer component 304 can analyze a second set of frequency resources. In some instances, at least a portion of the first set and the second set of frequency resources can be overlapping, and in some instances, the first set and the second set of frequency resources can be independent. In some instances, the communication component 308 can take priority over resources of the user equipment 300 to conduct a communication. That is, if the spectrum analyzer component 304 initiates a scan of a frequency resource, and if the communication component 308 subsequently initiates a communication using the frequency resource or another frequency resource, in some instances, the communication component 308 can initiate the communication by interrupting the spectrum analyzer component 304. In some instances, other prioritization schemes may be used, and the communication component 308 can have any relative or absolute priority level.

The location component 310 can include functionality to determine a location of the user equipment 300. In some instances, the location component 310 can determine a location based at least in part on GPS location data, base station identity, Wi-Fi access point identity, or a combination of location sources. In some embodiments, a location can include a mobile network code (MNC) and a mobile country code (MCC) used in combination to uniquely identify a mobile network carrier network. In some embodiments, the location component 310 can determine a base station or cell identity, and/or latitude, longitude, altitude information, and timestamp information. In some instances, the location can be determined in connection with determining one or more metrics associated with a signal or channel. In some instances, the location can be provided to a network device, for example, for aggregation and analysis. In some instances, the location component 310 can determine a location of the user equipment 300 relative to a location of a geofenced location. For example, the location component 310 can receive a geofenced location from a network device.

The power management component 312 can include functionality to determine a status and/or level of a power resource of the user equipment 300. For example, the power management component 312 can determine a remaining battery percentage, remaining charge, used charge, etc. to evaluate resources of the user equipment 300. Further, the power management component 312 can determine that the power resource is above or below a threshold value, for example, to determine whether the remaining amount of energy is sufficient for expected levels of activity. In some instances, a schedule for initiating scanning of frequency resources can be based at least in part on a power resource of the user equipment 300. For example, when a battery level is relatively high (and/or the user equipment 300 is connected to an external source of power) the scanning can be initiated more frequently than when a battery level is relatively low (and/or the user equipment is not connected to external power). Of course, a variety of power management schemes can be used to initiate scanning based at least in part on available power resources.

The reporting component 314 can include functionality to store one or more metrics associated with one or more frequency resources and to send such metrics to a network device. In some instances, the reporting component 314 can send the one or more metrics to a network device as the one or more metrics are generated, captured, or determined. In some instances, the reporting component 314 can aggregate the metrics and send the aggregated metrics to the network device. In some instances, the reporting component 314 can send the metrics based on a connection type of the user equipment 300 (e.g., when the user equipment 300 is connected to a Wi-Fi network). In some instances, the reporting component 314 can send the metrics at a time of low network congestion (e.g., at night). In some instances, the reporting component 314 can transmit metrics in response to a query from a network device, for example. In some instances, the reporting component 314 can encode the data sent to a network device such that a service provider tracking data usage does not count the data against a quota associated with the user equipment 300.

In some embodiments, the processor(s) 316 is a central processing unit (CPU), a graphics processing unit (GPU), or both CPU and GPU, or other processing unit or component known in the art.

The user equipment 300 also includes additional data storage devices (removable and/or non-removable) such as, for example, magnetic disks, optical disks, or tape. Such additional storage is illustrated in FIG. 3 by removable storage 318 and non-removable storage 320. Tangible computer-readable media can include volatile and non-volatile, removable and non-removable media implemented in any method or technology for storage of information, such as computer readable instructions, data structures, program modules, or other data. Memory 302, removable storage 318 and non-removable storage 320 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 300. Any such tangible computer-readable media can be part of the user equipment 300.

In various embodiments, the user equipment 300 can include applications including but are not limited, a web browser application, a video streaming application, an online gaming application, a spectrum analyzer, and the like. During execution on the user equipment 102, each of the applications may be configured to cause the user equipment 102 to initiate data communications with the network device(s) 112 over the network(s) 114.

The user equipment 102 may be configured to communicate over a telecommunications network using any common wireless and/or wired network access technology. Moreover, the user equipment 102 may be configured to run any compatible device operating system (OS), including but not limited to, Microsoft Windows Mobile, Google Android, Apple iOS, Linux Mobile, as well as any other common mobile device OS.

The user equipment 300 also can include input device(s) 322, such as a keypad, a cursor control, a touch-sensitive display, voice input device, etc., and output device(s) 324 such as a display, speakers, printers, etc. These devices are well known in the art and need not be discussed at length here.

As illustrated in FIG. 3, the user equipment 300 also includes one or more wired or wireless transceiver(s) 326. For example, the transceiver(s) 326 can include a network interface card (NIC), a network adapter, a LAN adapter, or a physical, virtual, or logical address to connect to various network(s) 114, or to the network device(s) 112, for example. To increase throughput when exchanging wireless data, the transceiver(s) 326 can utilize multiple-input/multiple-output (MIMO) technology. The transceiver(s) 326 can comprise any sort of wireless transceivers capable of engaging in wireless, radio frequency (RF) communication. The transceiver(s) 326 can also include other wireless modems, such as a modem for engaging in Wi-Fi, WiMax, Bluetooth, infrared communication, and the like.

In some instances, the transceiver(s) 326 can correspond to the transceiver(s) 106 of FIG. 1.

Figure 4:
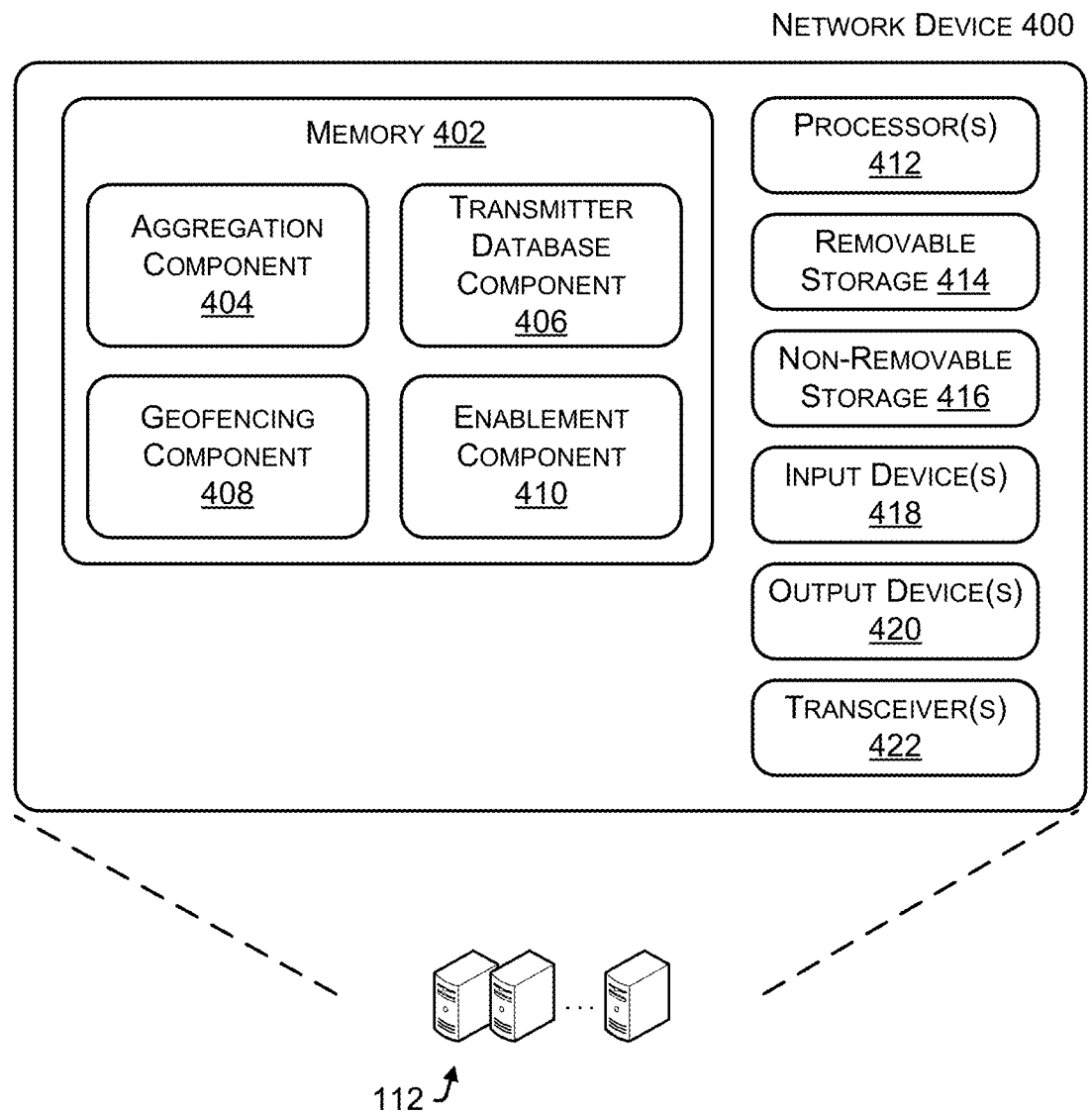
FIG. 4 illustrates an example network device configured to receive network metrics captured by user equipment, in accordance with embodiments of the disclosure.

FIG. 4 illustrates an example network device 400 configured to receive network metrics captured by user equipment, in accordance with embodiments of the disclosure. In some embodiments, the network device 400 can correspond to the network device 112 of FIG. 1. It is to be understood in the context of this disclosure that the network device 400 can be implemented as a single device or as a plurality of devices with components and data distributed among them.

As illustrated, the network device 400 comprises a memory 402 storing an aggregation component 404, a transmitter database component 406, a geofencing component 408, and an enablement component 410. Also, the network device 400 includes processor(s) 412, a removable storage 414 and non-removable storage 416, input device(s) 418, output device(s) 420, and transceiver(s) 422.

In various embodiments, the memory 402 is volatile (such as RAM), non-volatile (such as ROM, flash memory, etc.) or some combination of the two. The aggregation component 404, the transmitter database component 406, the geofencing component 408, and the enablement component 410 stored in the memory 402 can comprise methods, threads, processes, applications or any other sort of executable instructions. The aggregation component 404, the transmitter database component 406, the geofencing component 408, and the enablement component 410 can also include files and databases.

The aggregation component 404 can include functionality to receive one or more metrics determined and/or captured by user equipment, as discussed herein. In some instances, the aggregation component 404 can receive a plurality of metrics and store the metrics in a database. In some instances, the metrics can be indexed by location, time, user equipment, and the like. In some instances, the aggregation component 404 can perform any statistical analysis on the metrics to determine a variety of signal characteristics. For example, the aggregation component 404 can determine a signal type (e.g., TV, radio, cell phone, etc.) as well as quantitate or qualitative characteristics of the signal.

In some instances, the aggregation component 404 can correspond to the aggregation component 116 of FIG. 1.

The transmitter database component 406 can store locations of transmitters and/or base stations in a database. Further, the transmitter database component 406 can receive location data and/or metrics associated with a signal to determine which transmitter corresponds to the metrics. In some instances, the transmitter database component 406 can determine a confidence value associated with the identity of a transmitter or base station.

The geofencing component 408 can include functionality to determine areas in which the spectrum analysis should be performed. For example, the geofencing component 408 can determine areas around a legacy transmitter (e.g., a TV antenna) where metrics are to be determined. In some instances, the geofencing component 408 can determine areas where network resources (e.g., new base stations) are to be deployed to confirm signal status in that area. In some instances, the geofencing component 408 can determine areas where signal characteristics are known such that the spectrum analysis is not needed. In some instances, the geofencing component 408 can send indications of the geofenced locations to one or more user equipment to collect metrics, as discussed herein.

The enablement component 410 can include functionality to enable a spectrum analysis component for individual user equipment. For example, the enablement component 410 can send invitations to various user equipment to determine if users of the user equipment wish to activate the spectrum analyzer, as discussed herein. In some instances, the enablement component 410 can enable the spectrum analyzer component for individual user equipment based at least in part on characteristics of the user component, such as whether an antenna of the user equipment is configured to receive signals associated with particular frequency resources.

In further examples, the enablement component 410 can provide an instruction or indication to conduct drive-testing in an area based at least in part on metrics obtained by user equipment, as discussed herein.

In some embodiments, the processor(s) 412 is a central processing unit (CPU), a graphics processing unit (GPU), or both CPU and GPU, or other processing unit or component known in the art.

The network device 400 also includes additional data storage devices (removable and/or non-removable) such as, for example, magnetic disks, optical disks, or tape. Such additional storage is illustrated in FIG. 4 by removable storage 414 and non-removable storage 416. Tangible computer-readable media can include volatile and nonvolatile, removable and non-removable media implemented in any method or technology for storage of information, such as computer readable instructions, data structures, program modules, or other data. Memory 402, removable storage 414 and non-removable storage 416 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the network device 400. Any such tangible computer-readable media can be part of the network device 400.

The network device 400 can include input device(s) 418, such as a keypad, a cursor control, a touch-sensitive display, etc. Also, the network device 400 can include output device(s) 420, such as a display, speakers, etc. These devices are well known in the art and need not be discussed at length here.

As illustrated in FIG. 4, the network device 400 can include one or more wired or wireless transceiver(s) 422. In some wireless embodiments, to increase throughput, the transceiver(s) 422 can utilize multiple-input/multiple-output (MIMO) technology. The transceiver(s) 422 can be any sort of wireless transceivers capable of engaging in wireless, radio frequency (RF) communication. The transceiver(s) 422 can also include other wireless modems, such as a modem for engaging in Wi-Fi, WiMax, Bluetooth, infrared communication, or the like.

Figure 5:
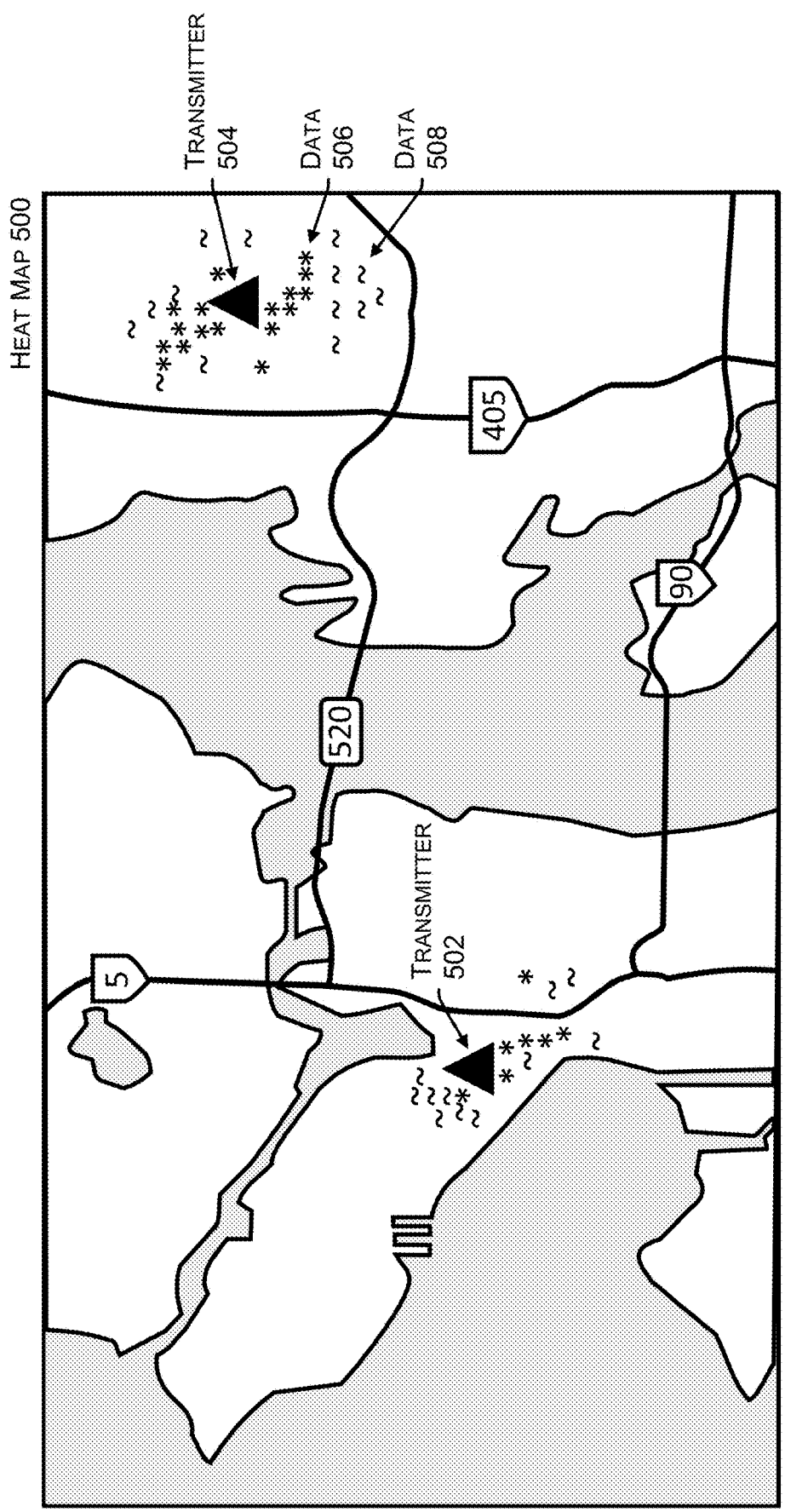
FIG. 5 illustrates an example visualization of data including data captured using a spectrum analyzer, as discussed herein.

FIG. 5 illustrates an example visualization of data including data captured using a spectrum analyzer, as discussed herein. In some instances, the example visualization can be represented as a heat map 500.

In some instances, the heat map 500 can represent various transmitters 502 and 504 in an environment. Further, the heat map 500 can represent various data 506 and 508, which can correspond to aggregated data and/or individual metrics collected by user equipment, as discussed herein. In some instances, the data 506 and 508 can represent various levels of metrics, such as RSSI, RSRP, RSRQ, or SINR, determined by the user equipment. For example, a relatively high RSSI metric can be represented as the data 506, corresponding to the symbol "*". In some examples, a relatively lower RSSI metric can be represented as the data 508, corresponding to the symbol "~". Of course, any indications (e.g., color, size, shape, labels, etc.) can be used to distinguish between various metrics. In some instances, the heat map 500 can be used in part to determine locations where active transmitters (e.g., the transmitter 502 or 504) are located, where user equipment experience interference and the like, and/or where to deploy additional base stations, for example.

In some instances, the heat map 500 can be generated by the aggregation components 116 and 404, as discussed herein. Of course, the example visualizations are not limited to the heat map 500. Further, the transmitters 504 and 504 are not limited to transmitters, and include any transceivers and/or base stations.

Figure 6:
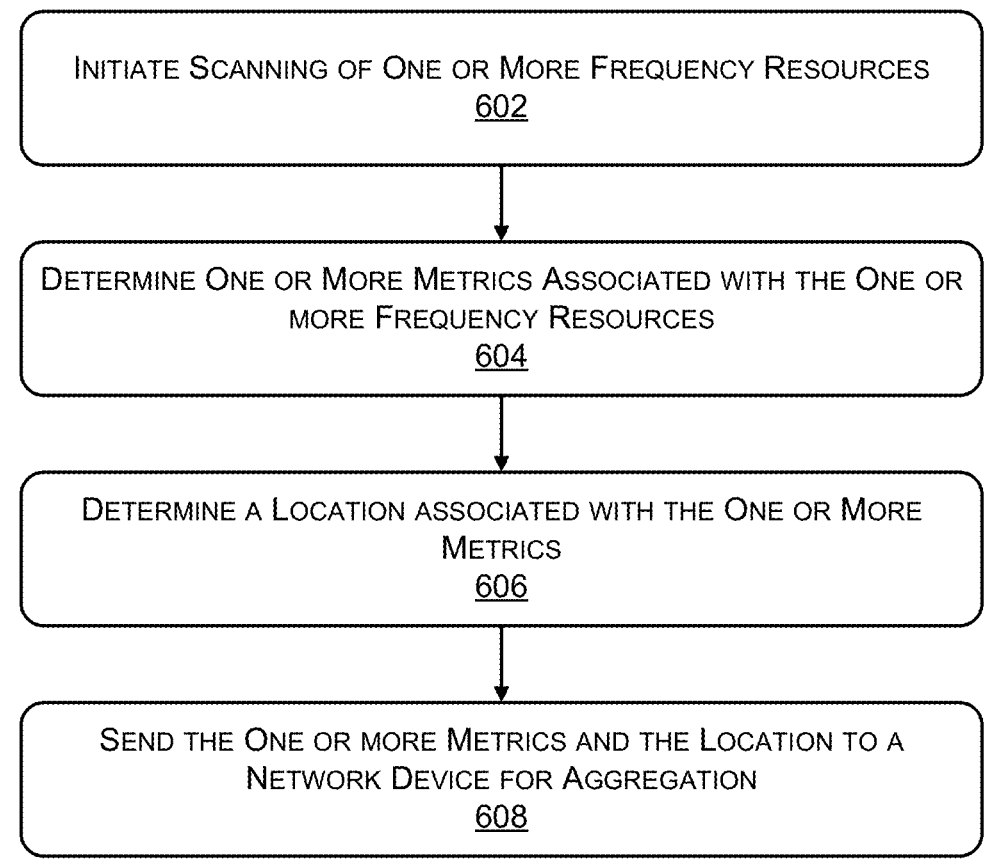
FIG. 6 illustrates an example process for scanning of one or more frequency resources to determine network metrics, as described herein.
Figure 7:
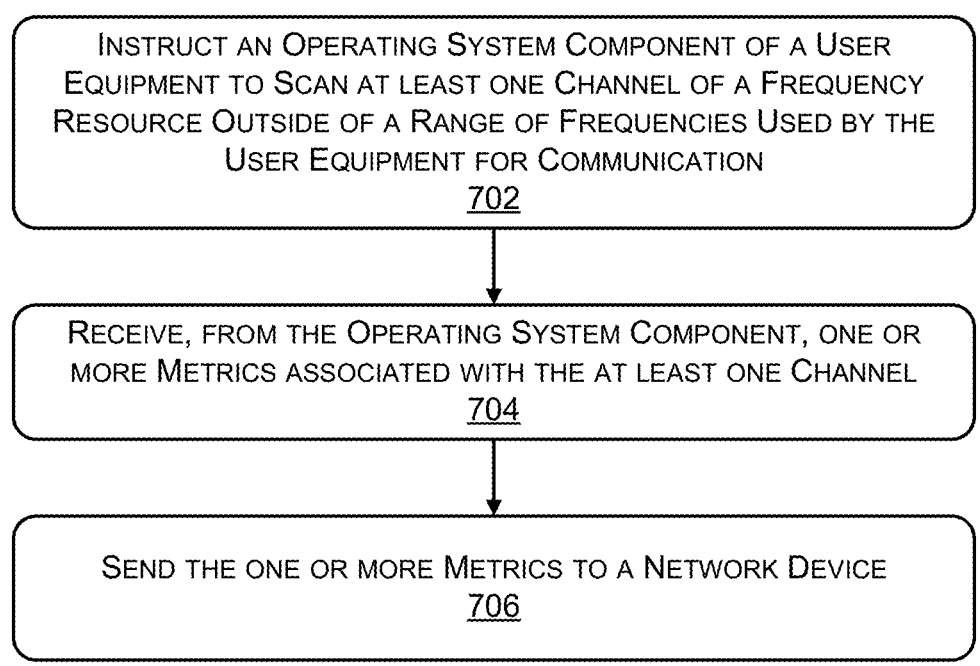
FIG. 7 illustrates an example process for instructing components of a user equipment to scan a channel of a frequency resource, as described herein.

FIGS. 6-8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 illustrates an example process 600 for scanning of one or more frequency resources to determine network metrics, as described herein. The example process 600 can be performed by the user equipment 102 and 202 (or another component), in connection with other components discussed herein. Some or all of the process 600 can be performed by one or more devices, equipment, or components illustrated in FIGS. 1-4, for example.

At 602, the operation can include initiating scanning of one or more frequency resources. In some instances, the operation 602 can be performed by the spectrum analyzer component 104 or 304, for example. In some instances, the one or more frequency resources can represent a range of frequencies used for wirelessly communicating information. In some instances, the one or more frequencies can correspond to various channels of a frequency band. In some instances, the operation 602 can include determining that one or more resources of a user equipment (e.g., a transceiver) is available to be used for scanning the one or more frequency resources. In some instances, the operation 602 can include tuning one or more components of a user equipment (e.g., filters associated with an antenna) to receive a signal associated with the one or more frequency resources.

At 604, the operation can include determining one or more metrics associated with the one or more frequency resources. As discussed herein, the one or more metrics can include, but are not limited to, one or more of RSSI, RSRP, RSRC, SINR, channel identifier, channel frequency, timing information (e.g., delay), and the like. In some instances, the one or more metrics can also include information associated with the user equipment, including but not limited to, one or more of a user equipment identifier, antenna capabilities, software version, hardware version, amount of power consumed, number of measurements, and the like. In some instances, the operation 602 can include performing any signal processing and/or statistical analysis on signals and/or data to determine the one or more metrics.

In some instances, the operation 604 can further include determining a type of interference associated with the one or more frequency resources. For example, the operation can include demodulating at least a portion of the one or more frequency resources. In some instances, the one or more frequency resources can be modulated suing a variety of techniques including, but are not limited to, Binary Phase Shift Keying (BPSK), Quadrature Phase-Shift Keying (QPSK), 16-Quadrature Amplitude Modulation (16QAM), 64QAM, or 256QAM. Thus, demodulation techniques can be used to demodulate a modulated signal. In some instances, if one or more demodulation techniques fail, the operation 604 can determine that interference associated with the one or more frequency resources can be an interference signal (e.g., from a non-LTE signal).

At 606, the operation can include determining a location associated with the one or more metrics. For example, the location can include a location of the user equipment at the time in which the one or more metrics are determined with respect to the one or more frequency resources. In some instances, the location can be based at least in part on GPS data captured by the user equipment.

At 608, the operation can include sending the one or more metrics and the location to a network device for aggregation. For example, the operation 608 can include sending the metrics and location to the network device(s) 112, as discussed herein. As data is received by the network device, the data can be aggregated to determine transmitter location(s), location(s) of interference, location(s) where to deploy network resources (e.g., a base station), and the like.

FIG. 7 illustrates an example process 700 for instructing components of a user equipment to scan a channel of a frequency resource, as described herein. The example process 700 can be performed by the user equipment 102 and 202 (or another component), in connection with other components discussed herein. Some or all of the process 600 can be performed by one or more devices, equipment, or components illustrated in FIGS. 1-4, for example.

At 702, the operation can include instructing an operating system component of a user equipment to scan at least one channel of a frequency resource outside of a range of frequencies used by the user equipment for communication. For example, the user equipment can utilize a first range of frequencies (e.g., associated with one or more of 2G, 3G, 4G, and/or 4G LTE technologies) to facilitate communications with other devices. In some instances, the operation 702 can include initiating scanning on at least one channel of a second range of frequencies, whereby the first range of frequencies is mutually exclusive of the second range of frequencies. In some instances, the operation 702 can be initiated by an application, such as a spectrum analyzer application, operating on the user equipment. In some instances, the operation 702 can include calling one or more APIs associated with the various components to facilitate the scanning of at least one channel, as discussed herein.

At 704, the operation can include receiving, from the operating system component, one or more metrics associated with the at least one channel. In some instances, the one or more metrics can include, but are not limited to, RSSI, RSRP, RSRQ, SINR, and the like. Further, as discussed herein, the operation 704 can include receiving location information from other components of the user equipment.

At 706, the operation can include sending the one or more metrics to a network device, such as the network device(s) 112 of FIG. 1.

FIG. 8 illustrates an example process 800 for initiating scanning based on a power resource and/or location of user equipment, as described herein. The example process 800 can be performed by the user equipment 102 and 202 (or another component), in connection with other components discussed herein. Some or all of the process 600 can be performed by one or more devices, equipment, or components illustrated in FIGS. 1-4, for example.

At 802, the operation can include determining a power resource of a user equipment. In some instances, the power resource can be an internal power resource associated with the user equipment, such as a battery. In some instances, the power resource can be a state of an external power resource, such as a connection to a power grid. In some instances, the operation 802 can include determining usage statistics based on historical usage patterns, a number of applications in use, and the like.

At 804, the operation can include determining a location of the user equipment. For example, the operation can include determining a location of the user equipment relative to a geofenced location or area where the spectrum analysis is enabled or disabled, depending on the implementation. In some instances, the location can be determined from GPS data, for example, while the geofenced location or area can be received from a network device At 806, the operation can include initiating scanning of at least one channel based at least in part on the power resource and the location of the user equipment. For example, the operation 806 can include determining that a power resource of a user equipment is above a threshold value, and initiating scanning based on the power resource being above the threshold value. In some instances, the operation 806 can include determining that the location of the user equipment is within a geofenced location where scanning is permitted, or determining that the location of the user equipment is within a threshold distances of a particular location, and initiating the scanning accordingly.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
one or more processors;
a memory; and
one or more components stored in the memory and executable by the one or more processors to perform operations comprising:
conducting at least one communication via a first set of frequency resources;
determining an external power resource associated with the user equipment;
initiating, via an application operating on the device and based at least in part on the external power resource, a scan of a second set of frequency resources, wherein i) the first set of frequency resources includes at least one first channel associated with at least one of a 700 MHz band, 1700 MHz band, a 1900 MHz band, or a 2100 MHz band; and ii) the second set of frequency resources includes at least one second channel associated with a 600 MHz band or a 3500 MHz band;
detecting a signal associated with the second set of frequency resources;
determining one or more metrics associated with the signal, the one or more metrics including at least one of a received signal strength indication (RSSI), a reference signal received power (RSRP), a reference signal received quality (RSRQ), or a signal-to-interference-plus-noise ratio (SINR); and
sending the one or more metrics to a network device for aggregation and analysis.

2. The device of claim 1, wherein the operations further comprise:
determining a location of the device associated with the one or more metrics; and
sending the location of the device to the network device for aggregation and analysis.

3. The device of claim 1, wherein the operations further comprise:
receiving, via a user interface of the device, a command indicative of enabling a spectrum analyzer mode, and
initiating the scan of the second set of frequency resources based at least in part on the command enabling the spectrum analyzer mode.

4. The device of claim 1, the operations further comprising:
determining that the signal does not include a reference signal;
determining that the signal is not associated with a wireless communication in response to determining that the signal does not include a reference signal; and
refraining from determining an SINR in response to determining that the signal is not associated with a wireless communication.

5. The device of claim 1, wherein the external power resource comprises a power grid.

6. The device of claim 1, wherein the operations further comprise:
scanning one or more channels of the second set of frequency resources based at least in part on a scanning schedule.

7. The device of claim 1, wherein the operations further comprise:
receiving, by the network device, a plurality of network metrics, wherein a network metric of the plurality of network metrics includes an associated location;
determining, by the network device and based at least in part on the plurality of network metrics, aggregated network metrics; and
determining, by the network device and based at least in part on the aggregated network metrics, an interference level of a channel associated with the second set of frequency resources.

8. The device of claim 1, wherein the operations further comprises initiating a communication via the first set of frequency resources.

9. The device of claim 1, further comprising determining a usage statistic associated with the device and wherein initiating the scan is based at least in part on the usage statistic.

10. A method comprising:
receiving, by a user equipment selectively configured to initiate a first communication via first set of frequency resources and to initiate a second communication via a second set of frequency resources, a command to configure the user equipment to initiate communications via the first set of frequency resources, the command being received via an application programming interface (API) implemented in an operating system of the user equipment;
determining an external power resource associated with the user equipment;
initiating, by the user equipment via an application operating on the user equipment and based at least in part on the external power resource, a scan of the second set of frequency resources, wherein i) the first set of frequency resources includes at least one first channel associated with at least one of a 700 MHz band, 1700 MHz band, a 1900 MHz band, or a 2100 MHz band; and ii) the second set of frequency resources includes at least one second channel associated with a 600 MHz band or a 3500 MHz band;
detecting, by the user equipment, a signal associated with the second set of frequency resources;
determining, by the user equipment, one or more metrics associated with the signal;
determining, by the user equipment, a location associated with the one or more metrics; and
sending, by the user equipment, the one or more metrics and the location to a network device.

11. A system comprising:
one or more processors;
a memory; and
one or more components stored in the memory and executable by the one or more processors to perform operations comprising:
determining, via an application operating on a user equipment, that the user equipment is not using at least one first frequency resource;
determining an external power resource associated with the user equipment;

initiating, via the application operating on the user equipment and based at least in part on the external power resource, a scan of at least one second frequency resource in response to determining that the user equipment is not using the at least one first frequency resource, wherein i) the first frequency resource includes at least one first channel associated with at least one of a 700 MHz band, 1700 MHz band, a 1900 MHz band, or a 2100 MHz band; and ii) the second frequency resource includes at least one second channel associated with a 600 MHz band or a 3500 MHz band;

detecting a signal associated with the at least one second frequency resource;

determining one or more metrics associated with the signal;

determining a location associated with the one or more metrics; and sending the one or more metrics and the location to a network device.

12. The system of claim 11, wherein the one or more metrics include one or more of:
a received signal strength indication (RSSI);
a reference signal received power (RSRP);
a signal-to-interference-plus-noise ratio (SINR); or
a reference signal received quality (RSRQ).

13. The system of claim 11, wherein the at least one first frequency resource associated with a first frequency range, and wherein the operations further comprise:
initiating a communication using the at least one second frequency resource, wherein the at least one second frequency resource is associated with a second frequency range that is separate from the first frequency range; and
initiating the scan of the at least one first frequency resource independent of the communication using the at least one second frequency resource.

14. The system of claim 11, wherein the operations further comprise:
initiating a communication using the at least one second frequency resource;
determining a signal-to-interference-plus-noise ratio (SINR) associated with the at least one second frequency resource;
determining that the SINR is above a first threshold value;
determining a received signal strength indication (RSSI) associated with the at least one second frequency resource;
determining that the RSSI is above a second threshold value; and
sending the one or more metrics including the SINR to the network device.

15. The system of claim 11, wherein the operations further comprise:
determining a location associated with the user equipment; and
initiating the scan of the at least one second frequency resource based at least in part on the external power resource and the location.

16. The system of claim 11, wherein the operations further comprise:

providing a user interface for presentation via the user equipment;
receiving a command via the user interface, the command indicative of enabling a spectrum analyzer mode; and
initiating the scan of the at least one second frequency resource based at least in part on the command enabling the spectrum analyzer mode.

17. The system of claim 11, wherein operations further comprise:
determining a location of the user equipment initiating the scan; and
sending the location of the user equipment to the network device for aggregation and analysis.

18. The system of claim 11, and wherein the operations further comprise:
scanning one or more channels of the at least one second frequency resource based at least in part on a scanning schedule.

19. The system of claim 11, wherein the operations further comprise:
receiving, by the network device, a plurality of network metrics, wherein a network metric of the plurality of network metrics includes an associated location;
determining, by the network device and based at least in part on the plurality of network metrics, aggregated network metrics; and
determining, by the network device and based at least in part on the aggregated network metrics, an interference level of a channel associated with the at least one second frequency resource.

20. The system of claim 11, wherein the usage statistic comprises at least one of a historical usage pattern or a number of applications in use.

21. The method of claim 10, wherein the one or more metrics include one or more of:
a received signal strength indication (RSSI);
a reference signal received power (RSRP);
a signal-to-interference-plus-noise ratio (SINR); or
a reference signal received quality (RSRQ).

22. The method of claim 10, wherein the method further comprises:
initiating, based at least in part on the command, a communication via the first set of frequency resources.

23. The method of claim 10, wherein the method further comprises:
determining a location associated with the user equipment; and
initiating the scan of the second set of frequency resources based at least in part on the external power resource and the location.

24. The method of claim 10, wherein the method further comprises:
presenting a user interface via a display of the user equipment;
receiving a command via the user interface, the command indicative of enabling a spectrum analyzer mode; and
initiating the scan of the second set of frequency resources based at least in part on the command enabling the spectrum analyzer mode.

* * * * *